J. L. MORRIS.
HINGED BOTTOM FOR MEASURING DEVICES.
APPLICATION FILED FEB. 20, 1915.
1,186,423.
Patented June 6, 1916.
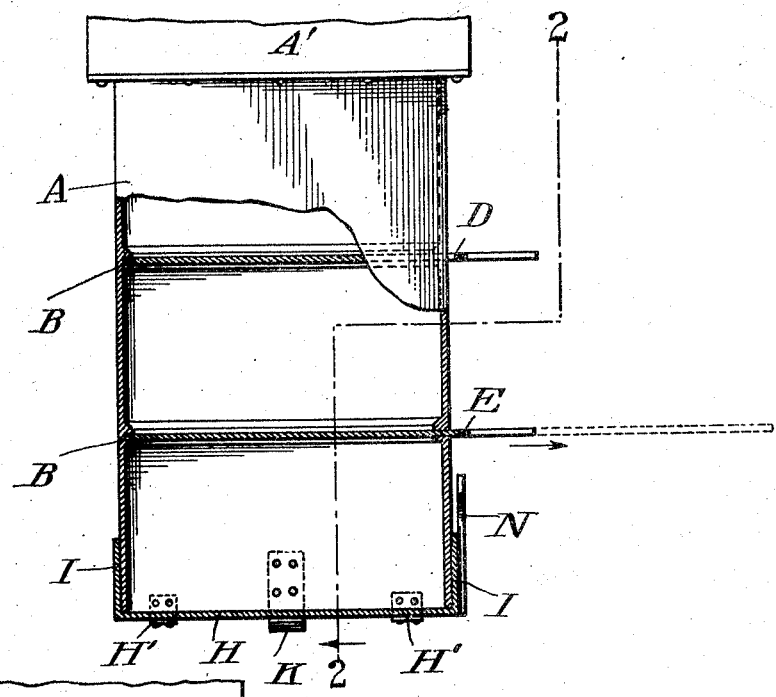
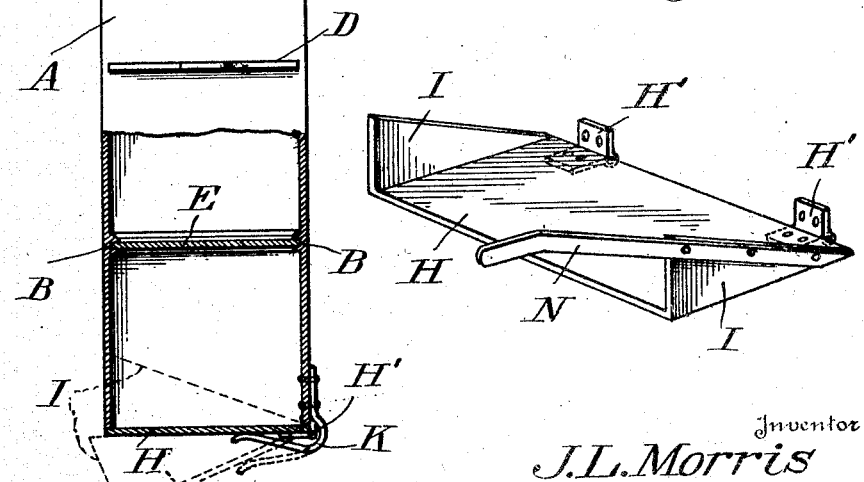
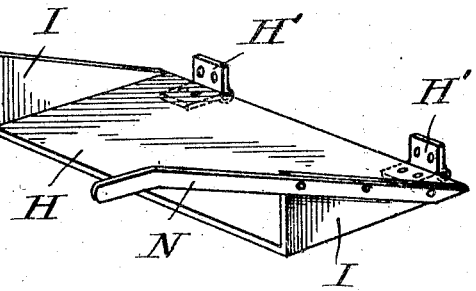
Inventor
J. L. Morris
By Franklin H. Hoyt
Attorney
Witnesses
Fenton S. Belt
J. W. Sherwood

UNITED STATES PATENT OFFICE.

JOLLY L. MORRIS, OF CRAFTON, PENNSYLVANIA.

HINGED BOTTOM FOR MEASURING DEVICES.

1,186,423.  Specification of Letters Patent.  Patented June 6, 1916.

Application filed February 20, 1915. Serial No. 9,679.

*To all whom it may concern:*

Be it known that I, JOLLY L. MORRIS, a citizen of the United States, residing at Crafton, in the county of Allegheny and State of Pennsylvania, have invented certain new and useful Improvements in Hinged Bottoms for Measuring Devices; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hinged bottoms for measuring devices.

The invention comprises various details of construction, combinations and arrangements of parts which will be hereinafter fully described, shown in the accompanying drawings and then specifically defined in the appended claims.

I illustrate my invention in the accompanying drawings, in which:—

Figure 1 is a side elevation of the apparatus, parts being in section. Fig. 2 is a sectional view on line 2—2 of Fig. 1, and Fig. 3 is a detail perspective view of a part of the device.

Reference now being had to the details of the drawings by letter, A designates a casing of a measuring device secured to a bin A' having a series of oppositely disposed grooves B in the inner surface of the walls and adapted to receive the slides D and E respectively, the slide D being adjusted through a slot in the side wall and in the manner shown in Fig. 1 of the drawings when it is desired to measure a certain quantity of material to fill the compartment above the slide. When it is desired to measure a larger quantity, the upper slide is removed and the slide E adjusted in place which will measure twice the quantity to be measured by the use of the slide D.

The bottom, designated by letter H, is hinged at H' to the open bottom of the receptacle and has two end flanges I which serve to guide the material as it is dispensed at the bottom of the receptacle.

A spring, designated by letter K, is fastened to the back, as shown clearly in Figs. 1 and 2 of the drawings, and is hook-shaped and its free end bears yieldingly against the bottom and normally holds the same closed.

The two flanges I, when closed, are positioned as shown in Fig. 1 of the drawings. The spring will be sufficiently strong to hold any quantity of material being measured. A handle N is fastened to one flange I and affords means whereby the bottom may be swung upon its hinges when it is desired to dispense the material that is being measured.

By the provision of a measuring apparatus embodying the features of my invention, it will be noted that a simple and efficient device is afforded whereby different quantities of commodities may be readily measured and dumped or dispensed at the lower end by pressing down upon the lever which opens the bottom against the tension of the spring K, the flanges directing the material as it falls by gravity.

What I claim to be new is:—

1. In combination with the casing of a measuring device, a bottom hinged to the lower portion thereof and provided with end flanges to guide the material as it is dispensed at the bottom of said casing and a spring fastened to the back wall of said casing above the hinges of the bottom and having a curved portion extending about the hinged edge of said bottom and inclined forwardly and upwardly and provided with a curved surface near its free end bearing yieldingly against the under side of said bottom to normally hold the latter closed and yielding as the weight on said bottom increases.

2. In combination with the casing of a measuring device, a bottom hinged to the lower portion thereof and provided with end flanges to guide the material as it is dispensed at the bottom of said casing and a spring fastened to the back wall of said casing above the hinges of the bottom and having a curved portion extending about the hinged edge of said bottom and inclined forwardly and upwardly and provided with a curved surface near its free end bearing yieldingly against the under side of said bottom to normally hold the latter closed and yielding as the weight on said bottom increases, said end flanges being of triangular shape, and a handle attached to the outer face of one of said flanges parallel with the upper edge thereof.

In testimony whereof I hereunto affix my signature in presence of two witnesses.

JOLLY L. MORRIS.

Witnesses:
S. V. BARTON,
ERNEST PAYNE.